Figure 1:
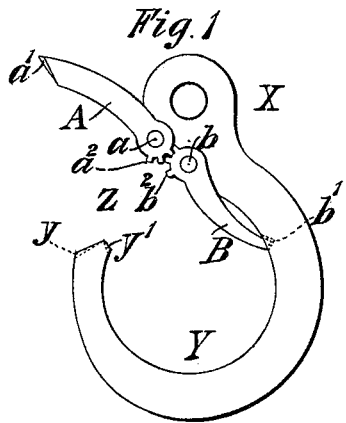

No. 644,699. Patented Mar. 6, 1900.
H. G. WOODFORD.
SAFETY HOOK, RING, &c.
(Application filed Aug. 21, 1899.)
(No Model.)

Witnesses
Arthur Fairhurst
Norman Lawson

Inventor H. G. Woodford
by his Attorney
W. J. Munden

THE NORRIS PETERS CO., PHOTO-LITHO., WASHINGTON, D. C.

UNITED STATES PATENT OFFICE.

HORACE G. WOODFORD, OF LONDON, ENGLAND.

SAFETY HOOK, RING, &c.

SPECIFICATION forming part of Letters Patent No. 644,699, dated March 6, 1900.

Application filed August 21, 1899. Serial No. 728,007. (No model.)

*To all whom it may concern:*

Be it known that I, HORACE GEORGE WOODFORD, a subject of the Queen of Great Britain and Ireland, and a resident of 11 Raines Mansions, Old Gravel Lane, St. Georges-in-the-East, London, in the county of Middlesex, England, have invented a certain new and useful Safety Hook, Ring, and the Like, (for which I have obtained a patent in Great Britain, No. 15,981, bearing date August 4, 1899,) of which the following is a specification.

This invention relates to hooks, rings, and the like which require a portion of the hook or ring to be movable in order that a link of a chain, a ring, or other article may be inserted in it, the movable part afterward closing to render the holdfast secure. These are especially applicable to the hooks which are attached to the ends of chains used for hoisting or hauling with cranes and the like, in which the accidental engagement of weight with the hook or its disengagement therefrom might result in the fall of a cask or other heavy weight in such manner as to cause serious damage to property and injury to the men employed; but it is equally applicable to any purpose in which the hold of a hook or ring is required to be made certain, such as in harness, dog-chains, watch and other chains for personal use, and the like.

This invention consists in forming the tongues which close the openings in the hooks or rings double and pivoting them to the hook or ring, and so connecting them that one opens outwardly and the other inwardly, the movement of the one being necessarily accompanied by a corresponding movement of the other in the opposite direction. A spring, preferably of a spiral shape, is generally employed to hold the tongues together in their normal closed position;. but in some cases I make the outer tongue of such a weight that gravity causes it and the inner tongue to remain closed until they are opened by hand or otherwise.

In ordinary hooks for hoisting, for use with watch and dog chains and the like, the tongues are pivoted at points near the hook-shank, and when closed form a continuation of the solid part of the hook itself. It will be seen that by the employment of these hooks accidental slip is rendered impossible, as pressure upon either the inner or outer tongues tends to close both. The pivoted ends of the tongues may be connected or geared to each other in any manner which secures that the movement of one shall be accompanied by a corresponding movement of the other in the opposite direction.

In order that my invention may be fully understood and ascertained, I append drawings, in which—

Figure 2:
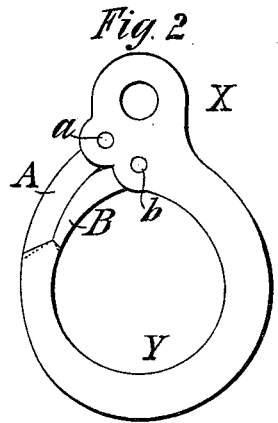
Figure 5:
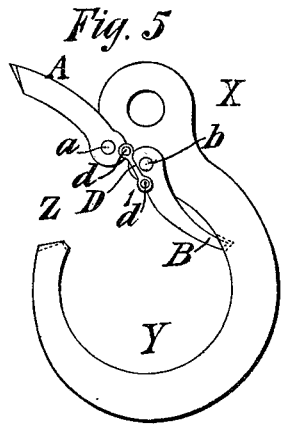
Figure 3:
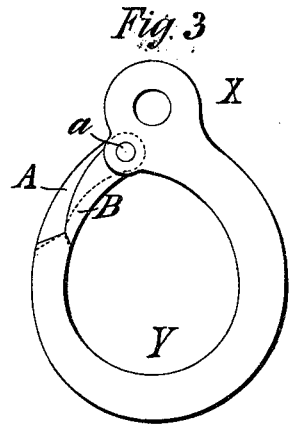
Figure 4:
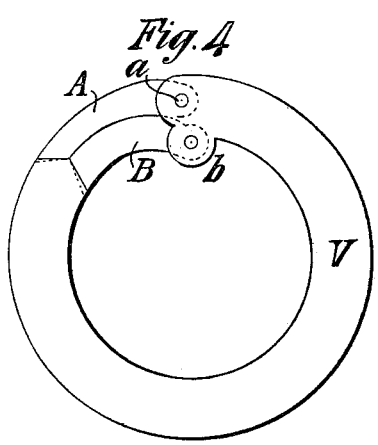
Figure 6:
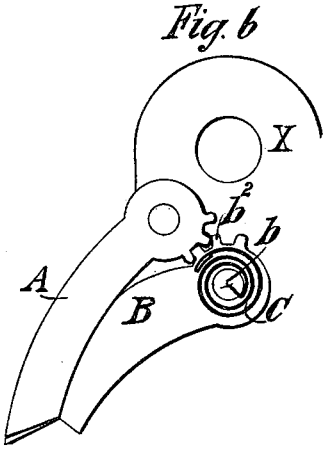

Figure 1 is an elevation of a hook suitable for attachment to the end of a crane-chain used for hoisting, with the tongues in an open position. Fig. 2 is an elevation of the same with the tongues in a closed position. Fig. 3 is an elevation of a modified form of hook. Fig. 4 is an elevation of a safety-ring according to my invention. Fig. 5 illustrates a modification of the manner in which the two tongues are connected. Fig. 6 shows a spiral spring applied to one of the tongues.

I will first describe my invention as applied to a hook of the description ordinarily employed in hoisting, in which X represents the shank, Y the body of the hook, and Z the space between the shank and the point of the hook, in which a ring, link, band, or sling attached to the article to be hoisted may be inserted. To a point near the shank of the hook are pivoted two tongues, A the outer, and B opening inwardly. These are pivoted at points $a$ and $b$, respectively, situate in close proximity one to the other. The tongues A and B are of such shape that when closed, as shown in Fig. 2, they form a continuation of the solid part of the hook itself, and preferably have projecting parts $a'$ and $b'$, (shown in Fig. 1,) which when closed fit into corresponding recesses $y$ and $y'$, formed in the point of the hook.

The pivoted end of each of the tongues has formed upon it a number of cogs or teeth $a^2$ and $b^2$, which engage with each other in such manner that when one tongue is moved the other is forced to make a corresponding movement in the opposite direction. Thus when open, as in Fig. 1, an external pressure upon the outer tongue or an internal pressure upon the inner tongue moves both to the closed position shown in Fig. 2. The tongues may be connected in any other suitable manner than that illustrated in Fig. 1—such, for instance, as by means of a link D and pins $d$ and $d'$, as shown in Fig. 5.

It will be seen that when the tongues A and B occupy the open positions shown in Fig. 1 rings, links, or the ends of a sling or slings may be inserted by passing through the opening Z into the interior of the hook. When the tongues are being closed, these will be held safely and any possibility of accidental slipping obviated. In some cases both tongues may be pivoted to the hook on a single pin $a$, as shown in Fig. 3. In this case the pivoted ends of both tongues and the hook-shank must be formed of a suitable shape. The tongues are preferably held in the closed position by a spring or springs. In Fig. 6 a spiral spring C is shown; but any suitable description of spring may be employed which produces the effect of normally closing the tongues.

In Fig. 4 the tongues A and B are shown applied to a ring V, these being pivoted at $a$ and $b$ in a manner similar to that shown with the hook. The ring and tongues are illustrated in Fig. 4.

In Fig. 5 is shown a hook the two tongues of which instead of being operatively connected by cogs or teeth, as shown in Fig. 1, have pins $d$ and $d'$ fixed to the pivoted end of the tongues, and these are connected by a link or rod D in such manner that the movement of either tongue is necessarily accompanied by a corresponding movement of the other tongue in the opposite direction.

It will be understood that I do not confine myself to any particular shape, configuration, or design of the hooks, rings, and tongues, but construct these of a shape suitable to each particular purpose, always retaining the essential feature of my invention, which consists in closing an opening or gap in a hook, ring, or the like by means of two tongues pivoted and connected in such manner that the movement of one tongue is necessarily accompanied by a corresponding movement of the other tongue in an opposite direction. In like manner when springs are employed for the purpose of causing the tongues to assume and retain their normal closed positions these may be of any description which serve to attain their purpose.

Having now described my invention, what I claim as new, and desire to secure by Letters Patent, is—

1. A safety hook or ring formed with an opening or gap, two tongues adapted to close said opening, one of which is adapted to open inwardly and the other outwardly, and means for connecting said tongues so that a movement of one tongue produces a corresponding movement of the other in the opposite direction, substantially as described and shown.

2. The combination with a hook, ring, or the like of two tongues A and B, pivoted to the hooks, and each capable of moving through an arc of a circle, the gearing teeth or cogs $a^2$ and $b^2$, and the spring C, substantially as described and shown.

In witness whereof I have hereunto set my hand in presence of two witnesses.

H. G. WOODFORD.

Witnesses:
 NORMAN LAWSON,
 ARTHUR FAIRHURST.